(12) United States Patent
Moore et al.

(10) Patent No.: US 6,866,128 B2
(45) Date of Patent: Mar. 15, 2005

(54) RETRACTABLE ANTI-STATIC DEVICES AND METHODS OF USING SAME

(75) Inventors: Bradley C. Moore, Spruce Pine, NC (US); Joey K. Horney, Newland, NC (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/370,204

(22) Filed: Feb. 20, 2003

(65) Prior Publication Data

US 2004/0163914 A1 Aug. 26, 2004

(51) Int. Cl.⁷ .............................................. H02G 11/02
(52) U.S. Cl. ...................... 191/12.4; 361/212; 361/220; 242/371
(58) Field of Search .............................. 191/12.4, 12 R, 191/12.2 R; 361/212, 220, 224; 242/371, 379, 379.2, 385.1, 385.2, 385.3, 385.4, 395, 398, 400

(56) References Cited

U.S. PATENT DOCUMENTS

| | | | |
|---|---|---|---|
| 4,245,486 A | | 1/1981 | Matsumoto et al. |
| 4,402,560 A | * | 9/1983 | Swainbank .................. 439/37 |
| 4,649,649 A | | 3/1987 | Fain |
| 4,663,854 A | | 5/1987 | Miller et al. |
| 4,677,521 A | | 6/1987 | Frazier |
| 4,687,155 A | * | 8/1987 | Burton ....................... 242/381 |
| 4,730,783 A | | 3/1988 | Lamson |
| 4,786,010 A | | 11/1988 | Dynan |
| 4,907,756 A | | 3/1990 | Bourrat |
| 4,924,597 A | | 5/1990 | Tursi |
| 5,184,274 A | * | 2/1993 | Weiss ......................... 361/220 |
| 5,403,214 A | | 4/1995 | Tirrell |
| 5,457,596 A | * | 10/1995 | Yang .......................... 361/220 |
| 5,515,234 A | * | 5/1996 | Frazier ....................... 361/212 |
| 5,788,478 A | | 8/1998 | DeNoia et al. |
| 6,215,639 B1 | * | 4/2001 | Hee ........................... 361/212 |
| 6,426,859 B1 | * | 7/2002 | Cohen ........................ 361/220 |

FOREIGN PATENT DOCUMENTS

WO          WO 2093708 A1 * 11/2002   .......... H02G/11/00

OTHER PUBLICATIONS

Radio Shack, Catalog No. 276–2397, Antic–Static Wrist Strap with Cord.
Radio Shack, Catalog No. 276–2395, Anti–Static Wrist Strap and Coiled Cord.
Radio Shack, Catalog No. 276–2370, Electronics Anti–Static Service Kit.

* cited by examiner

*Primary Examiner*—Frantz F. Jules
(74) *Attorney, Agent, or Firm*—Myers Bigel Sibley & Sajovec

(57) ABSTRACT

A retractable anti-static device includes a conductive grounding line that can be unwound from a wrist strap for use and wound back to the wrist strap when not being used. The conductive line, therefore, can be attached to ground when being used but can retract out of the way when not being used.

33 Claims, 4 Drawing Sheets

RETRACTABLE ANTI-STATIC DEVICES AND METHODS OF USING SAME

FIELD OF THE INVENTION

This invention relates to anti-static devices and methods, and more particularly to anti-static devices that may be worn by persons assembling, maintaining, repairing and/or operating electronic equipment and/or components thereof, and methods of using same.

BACKGROUND OF THE INVENTION

Electronic equipment, such as printed circuit boards, and components thereof such as integrated circuits, may be sensitive to static electricity. It is known to provide anti-static devices to allow a person who is assembling, maintaining, repairing and/or operating the electronic equipment to drain static charges to ground. For example, it is known to provide conductive mats on a work surface and/or on a floor adjacent a work surface. It is also known to provide a touch bar device that is attached to the equipment, which an operator touches before operating the equipment. These devices may be used in controlled areas, but it may be impractical to use them in the field and/or when the operator changes position.

It is also known to use a conductive wristband to effectuate grounding of accumulated static electricity from a person assembling, maintaining, repairing and/or operating electronic equipment. These anti-static wristbands generally include a strap that is configured to be worn on a wrist, and a conductive line that is configured to attach to ground. See, for example, U.S. Pat. No. 4,677,521 to Frazier entitled Static Dissipative Grounding Strap, and U.S. Pat. No. 5,403,214 to Tirrell entitled Grounding Jack. Anti-static wrist straps also are marketed by Radio Shack as Catalog Nos. 276-2397 (Antic-Static Wrist Strap With Cord), 276-2395 (Anti-Static Wrist Strap and Coiled Cord) and 276-2370 (Electronics Anti-Static Service Kit). Unfortunately, these anti-static wrist straps may be cumbersome to wear and/or use.

SUMMARY OF THE INVENTION

Embodiments of the present invention provide retractable anti-static devices having a conductive grounding line that can be unwound from a wrist strap for use and wound back to the wrist strap when not being used. The conductive line, therefore, can be attached to ground when being used, but can retract out of the way when not being used.

More particularly, according to some embodiments of the present invention, a device to be worn on a wrist to drain static electricity from a wearer to ground includes a strap that is configured to be worn on a wrist and a conductive line that is configured to attach to ground to drain static electricity to ground. An unwinding mechanism is coupled to the strap and to the conductive line, and is configured to enable the conductive line to be reversibly unwound from the strap. In some embodiments, the unwinding mechanism comprises a spiral spring that is configured to compress radially to enable the line to be unwound from the strap and to expand radially to enable the line to be wound back toward the strap. In other embodiments, the unwinding mechanism includes a spool, wherein the conductive line is at least partially wound on the spool. Still other embodiments include the spiral spring and the spool.

In still other embodiments, a lock is provided that is configured to prevent winding of the conductive line toward the strap. In still other embodiments, a housing is provided on the strap, wherein the unwinding mechanism resides in the housing and is configured to enable the conductive line to be reversibly unwound from the housing. Finally, in still other embodiments, the device is provided with a mechanism, such as a clip, for attaching the device to a wrist strap, such as a watchband, instead of and/or in addition to the strap.

Electronic components may be handled, according to some embodiments of the invention, by unwinding a conductive line to extend from a wrist strap that is worn by a wearer who handles the electronic components, and attaching the conductive line to ground. The electronic components then are handled during which the conductive line drains static electricity from the wearer to ground. After handling of the electronic components, the conductive line is wound back toward the wrist strap. In other embodiments, the conductive line may be locked during use and unlocked for retraction.

DETAILED DESCRIPTION OF PREFERRED EMBODIMENTS

Figure 1:
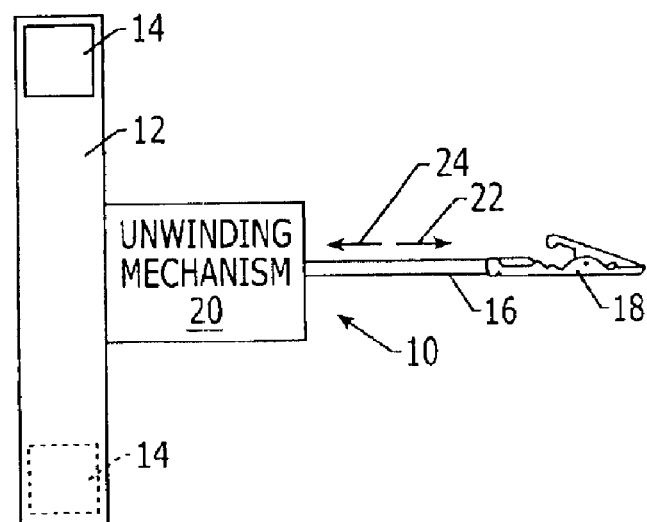
FIG. 1 is a schematic illustration of a retractable anti-static device according to some embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the relative sizes of elements may be exaggerated for clarity. Like numbers refer to like elements throughout. It will be understood that when an element is referred to as being "on" another element, it can be directly on the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 2:
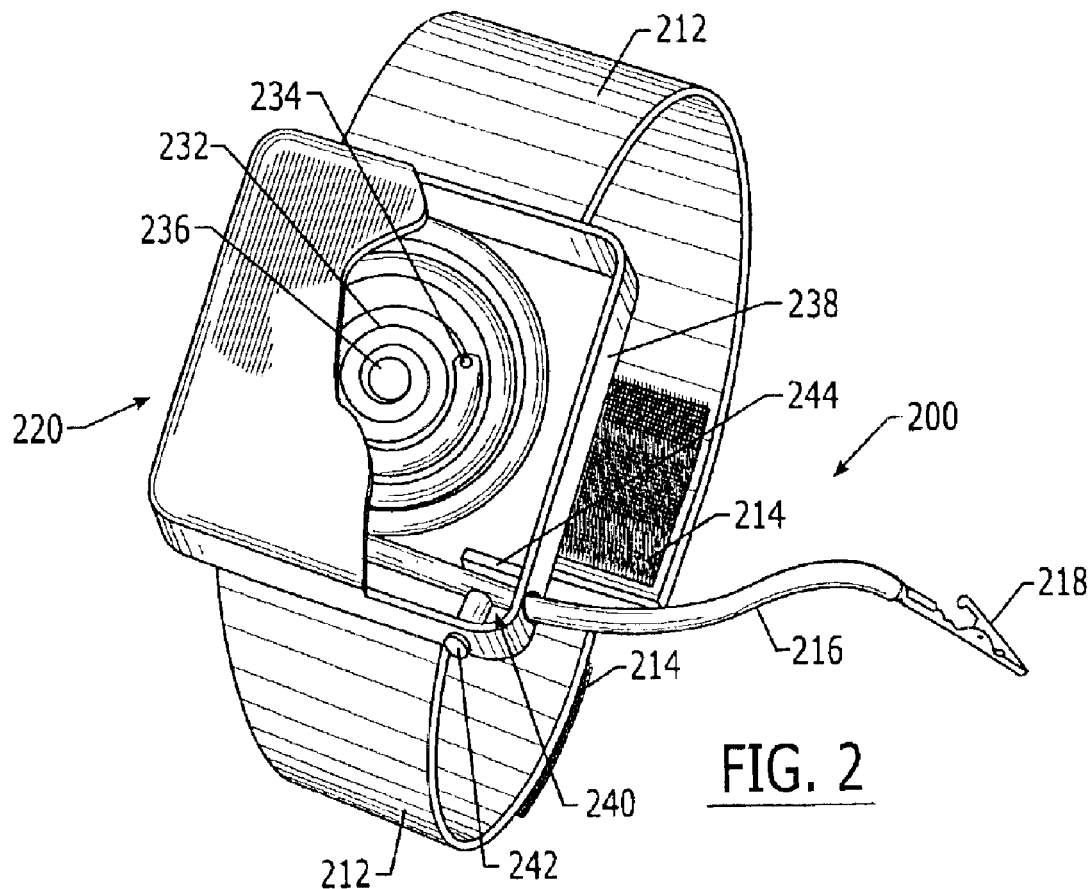
FIGS. 2–4 are front perspective views of retractable anti-static devices according to other embodiments of the invention.

FIG. 1 is a schematic illustration of a device to be worn on a wrist to drain static electricity from a wearer to ground according to some embodiments of the present invention. As shown in FIG. 1, the device 10 includes a strap 12 that is configured to be worn on a wearer's wrist. The strap 12 generally includes at least a flexible portion and may be fabricated at least in part from conductive material. The strap 12 may be expandable. A continuous strap may be provided that can be slipped over the hand of a wearer to be worn on the wrist or, as shown in FIG. 2, the strap may include a closure mechanism 14 at one or both ends thereof. The closure mechanism 14 may include Velcro®, a hook-and-eye arrangement and/or any other conventional closure mechanism, such as may be used for watches, bracelets and/or other conventional wristbands.

Continuing with the description of FIG. 1, a conductive line 16 is configured to attach to ground to drain static electricity to ground. The conductive line 16 is flexible and may be insulated and/or uninsulated. The conductive line 16 may be configured to attach to ground using a conventional alligator plug or clip 18, such as is used in the above-cited U.S. Pat. No. 4,677,521 or in the above-cited Radio Shack products, a grounding jack such as described in the above-cited U.S. Pat. No. 5,403,214 to Tirrell and/or other conventional mechanisms that are used to attach a conductive line to ground.

Finally, still referring to FIG. 1, an unwinding mechanism 20 is coupled to the strap 12 and to the conductive line 16. The unwinding mechanism 20 may be fixedly or removably coupled to the strap 12 and/or the conductive line 16. The unwinding mechanism 20 is configured to enable the conductive line 16 to be reversibly unwound from the strap 12, i.e. to be unwound from the strap 12 in a direction generally indicated by arrow 22, and to be wound back toward the strap 12 in the direction generally indicated by arrow 24.

Embodiments of unwinding mechanisms 20 according to some embodiments of the present invention will be described in detail below in connection with FIGS. 2–4. However, it will be understood that conventional spiral spring unwinding mechanisms that are used in retractable tape measures may be used, such as those described in U.S. Pat. No. 4,649,649 to Fain; U.S. Pat. No. 4,663,854 to Miller et al.; U.S. Pat. No. 4,687,155 to Burton; U.S. Pat. No. 4,730,783 to Lamson; U.S. Pat. No. 4,786,010 to Dynan; U.S. Pat. No. 4,907,756 to Bourrat; and U.S. Pat. No. 4,924,597 to Tursi. Other unwinding mechanisms that are used with other retractable devices, such as key rings and the like, such as those described in U.S. Pat. No. 4,245,486 to Matsumoto et al. and U.S. Pat. No. 5,788,478 to DeNoia et al., also may be used. Yet other crank-assisted unwinding mechanisms, such as conventionally used in fishing reels and/or extended length tape measures, may be used. In any of these embodiments, it may be desired to maintain electrical conduction from the conductive line 16 to the unwinding mechanism 20, and from the unwinding mechanism 20 to the strap 12, so that static charge may be drained from the wearer to ground.

FIG. 2 is a front perspective view of a retractable antistatic device 200 according to other embodiments of the present invention. These embodiments of retractable antistatic devices 200 include a strap 212 that is configured to be worn on a wrist and includes a closure mechanism 214. An unwinding mechanism 220 includes a spiral spring 232 that is coupled to a conductive line 216 using a conventional coupling mechanism 234 such as a rivet, screw, solder, hook-and-eye and/or other conventional coupling mechanism. The conductive line 216 includes a conventional alligator plug or clip 218 and/or other conventional mechanisms that are used to attach a conductive line to ground. The spiral spring 232 is configured to expand radially to enable the line 216 to be wound back toward the strap 212 and to compress radially to enable the line 216 to be unwound from the strap 212. In other embodiments, as also illustrated in FIG. 2, the unwinding mechanism 220 also includes a spool 236 that is coupled to the spiral spring 232 wherein the conductive line 216 is coupled to and at least partially wound on the spool 236 when the conductive line 216 is wound back toward the strap 212. In still other embodiments, the conductive line 216 and the spiral spring 232 are coupled to different portions of the spool 236, so that the spring 232 winds the spool 236 and the spool 236 winds the conductive line 216 onto the spool 236.

In still other embodiments, as also shown in FIG. 2, the device 200 includes a housing 238 on the strap, wherein the unwinding mechanism 220 resides in the housing 238 and is configured to enable the conductive line 216 to be unwound from the housing 238 and to be wound back into the housing 238. The housing 238 may be polygonal or non-polygonal in cross-section, and may comprise one or more pieces. The housing 238 may be conductive and/or non-conductive.

Finally, still referring to FIG. 2, in other embodiments of the present invention, a lock 240 is provided that is configured to prevent winding of the conductive line toward the strap 216. Conventional locking mechanisms that are used with other conventional retractable devices, such as tape measures, key rings fishing reels and/or the like, may be used.

In FIG. 2, the locks 240 is a friction lock that allows a movable member 242 to be pressed against a stationary member 244 with the conductive line 216 therebetween to exert a frictional locking force. In contrast, in FIG. 3, other devices 300 include a ratchet mechanism including teeth 352, a pin 354 that is configured to engage teeth 352, and a movable member 356 that is configured to lock and/or unlock the pin 354. The design of ratchet mechanisms is well known to those having skill in the art and need not be described further herein.

Figure 3:
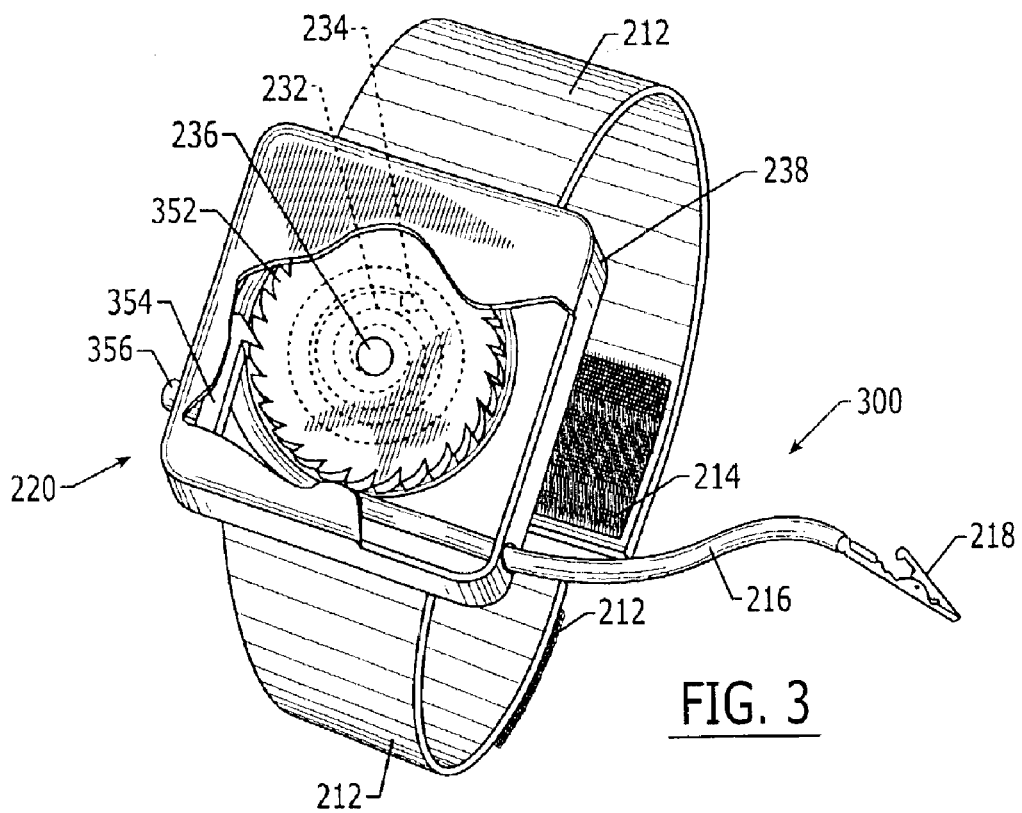
Figure 4:
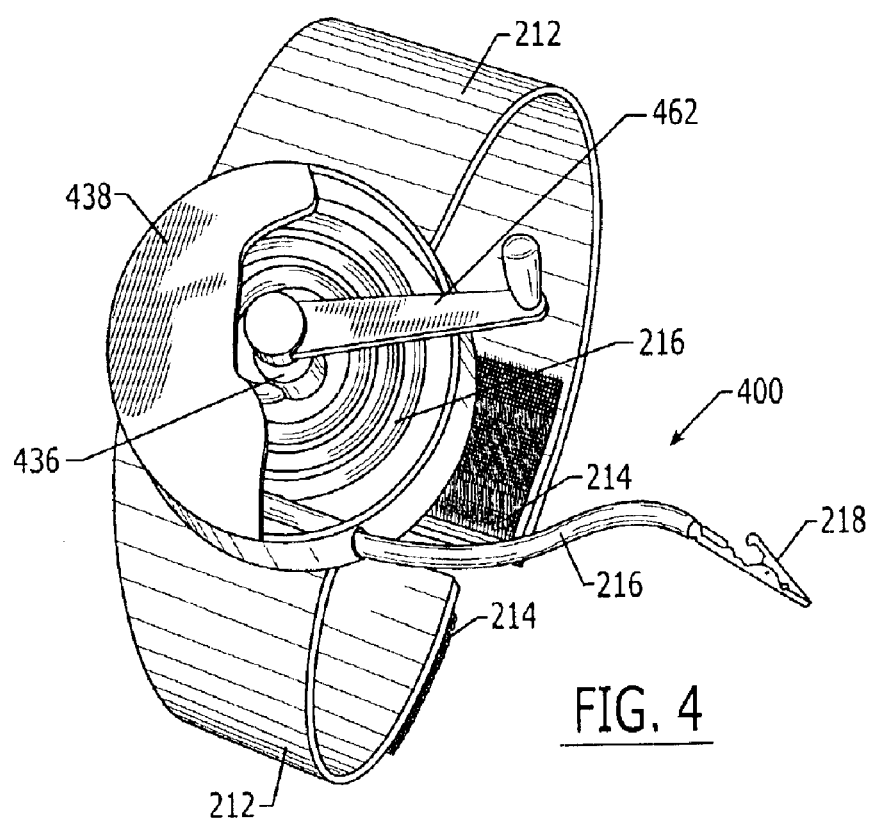

Embodiments of FIGS. 2 and 3 use a spiral spring 232 to provide a biasing or restoring force against the unwinding of the conductive line, and which can be used to rewind the conductive line. Other embodiments of the invention as illustrated in the front perspective view of FIG. 4, allow a crank to be used to unwind and/or wind the conductive line 216 from/to the housing. Thus, referring to FIG. 4, these devices 400 include a housing 438 which is illustrated as being circular in cross-section, but which may be polygonal or non-polygonal in cross-section, that includes therein a spool 436 on which a conductive line 216 is at least partially wound. A crank 462 is located outside the housing 438 and is coupled to the spool 436. The crank 462 may provide frictional force when unwinding the conductive line 216 from the spool 436 and may be used by a wearer to wind the conductive line 216 at least partially back onto the spool 436. Cranking mechanisms are widely used in fishing reels and other devices, and need not be described in detail herein.

Figure 5:
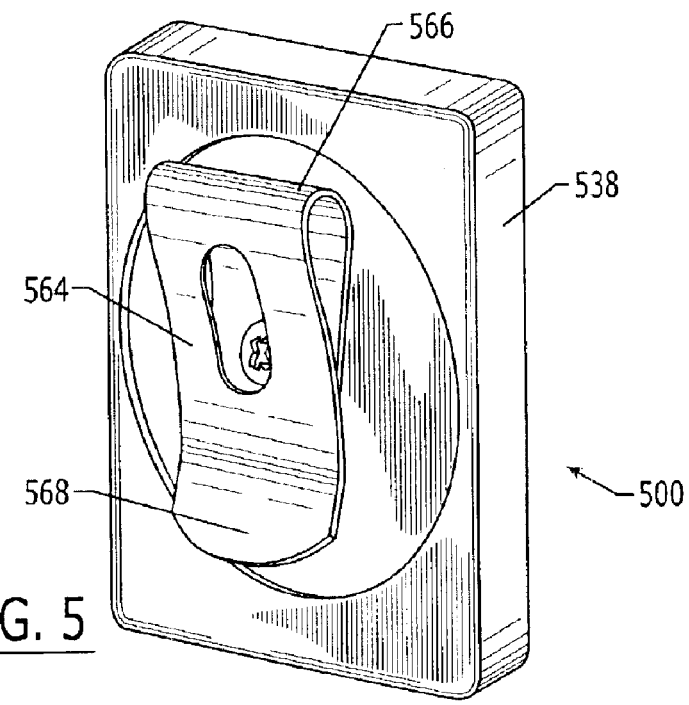
FIG. 5 is a rear perspective view of a housing of a retractable anti-static device according to other embodiments of the present invention.

Embodiments of the devices of FIGS. 1–4 include an integral strap 212 that is configured to be worn on a wrist. However, other embodiments of the present invention that are illustrated in FIG. 5 need not include an integral wrist strap. Rather, as shown in FIG. 5, a device 500 according to other embodiments of the present invention, includes a mechanism for attaching the device 500 to a wristband, such as a clip 564, on the rear of housing 538. The clip 564 may be configured for attachment to a metal watchband or other wrist strap, and may be at least partially conductive, so as to drain static electricity from the wearer to ground. As shown in FIG. 5, the clip 564 may be attached to the housing 538 at a closed end 566, and may include a free end 568 that is not attached to the housing. In other embodiments, the clip may comprise a loop that is attached to the housing 568 at both ends thereof. In yet other embodiments of the present invention, a wrist strap attaching mechanism, such as a clip 564, may be provided along with a wrist strap that can be fixedly or removably attached to the housing 538. Other conventional attaching mechanisms may be used.

Accordingly, embodiments of the present invention that were described above in connection with FIGS. 1–5 provide devices to be worn on a wrist to drain static electricity from a wearer to ground. These devices include means for attaching the device to a wrist which may be embodied as a wrist strap 212, a clip 564 and/or other structures that can directly or indirectly attach to a wrist. Means also are provided for enabling reversible unwinding the conductive line from the means for attaching. The means for enabling reversible unwinding can be embodied as a spiral spring 232, an attachment mechanism 234, a spool 236, 436 a crank 462, a housing 238, 438 and/or other conventional winding/unwinding mechanisms. As also shown in FIGS. 2 and 3, means for locking the conductive line to prevent winding of the conductive line also may be provided, which may be embodied as a frictional lock 240 of FIG. 2, a ratchet mechanism 352, 354 of FIG. 3 and/or other conventional locking mechanisms.

Figure 6:
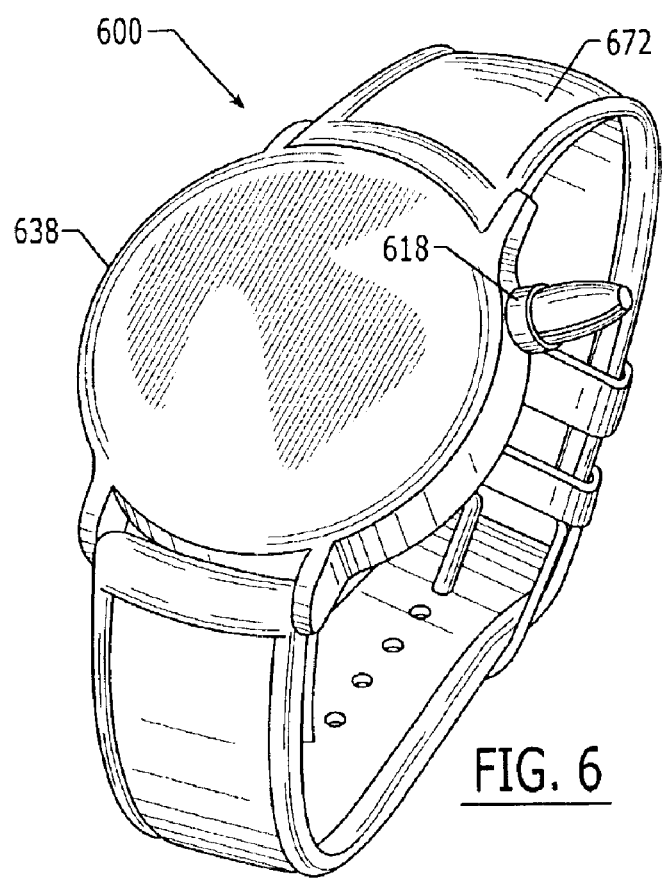
FIG. 6 is a front perspective view of a retractable anti-static device according to other embodiments of the present invention.

FIG. 6 illustrates a device 600 according to other embodiments of the present invention, wherein a retractable anti-static wrist strap is configured to resemble a conventional wristwatch. Thus, these embodiments include a strap 672 that is similar to a watchband, a housing 638 that is similar to a wristwatch housing, and a conventional plug 618 and/or other attachment mechanism, that is configured to attach to a conventional grounding point. The housing 638 may contain an unwinding mechanism therein, according to any of the embodiments that were described above.

Figure 7:
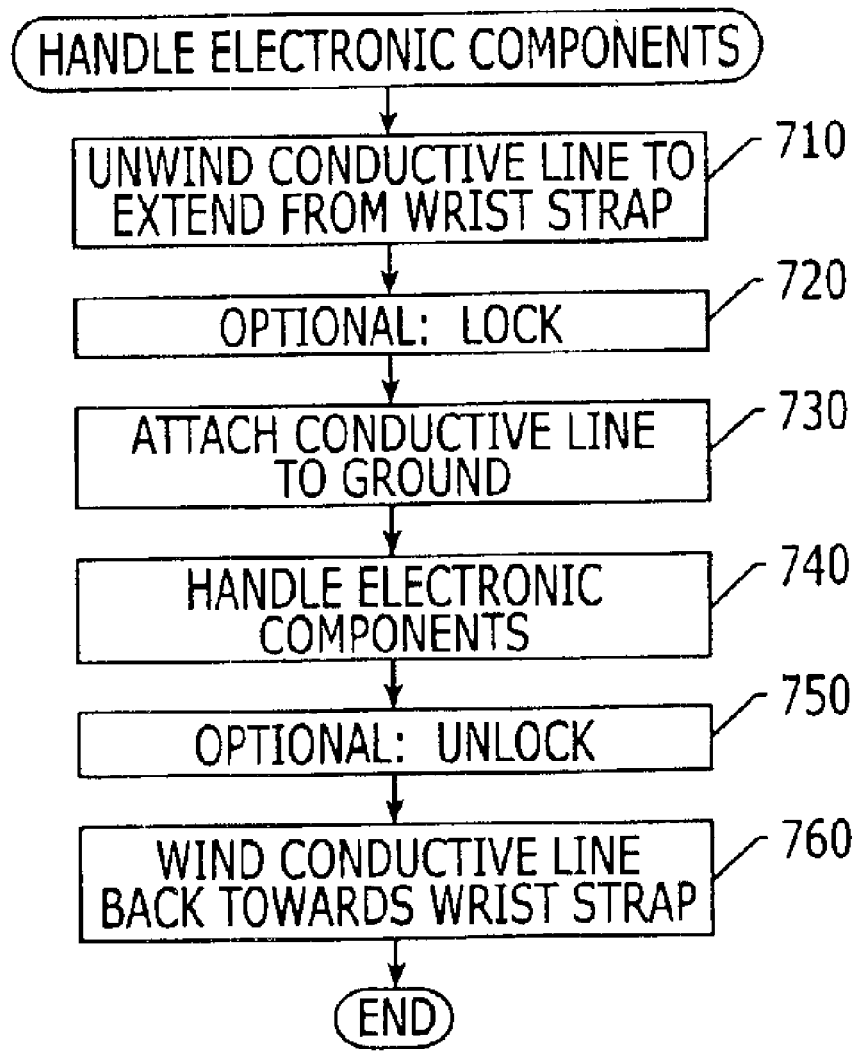
FIG. 7 is a flowchart of operations that may be used to handle electronic components according to embodiments of the present invention.

FIG. 7 is a flowchart of methods of handling electronic components according to some embodiments of the present invention. As shown in FIG. 7 at Block 710, a conductive line is unwound to extend from a wrist strap that is worn by a wearer who handles the electronic components. Prior to unwinding, the device may be placed on a wrist and/or attached to a wristband. Optionally, at Block 720, the conductive line that is extended from the wrist strap is locked in some embodiments of the present invention. As shown at Block 730, the conductive line is attached to ground, and at Block 740, the electronic components are handled during which the conductive line drains static electricity from the wearer to ground. If the device was locked at Block 720, then the device may be unlocked at Block 750 in some embodiments of the present invention. Finally, at Block 760, the conductive line is wound back toward the wrist strap after handling the electronic components. The device may then be removed from the wrist and/or wristband.

In some embodiments, the unwinding of Block 710 comprises unspooling the conductive line from a spool in the wrist strap and the winding of Block 760 comprises spooling the conductive line on the spool in the wrist strap. Moreover, in some embodiments, the unwinding of Block 710 comprises radially expanding the spiral spring that is connected to the conductive line and the winding of Block 760 comprises radially compressing the spiral spring that is connected to the conductive line.

Accordingly, embodiments of the present invention provide wearable anti-static devices that are retractable. The devices can, therefore, be worn without the need for a conductive line to dangle therefrom. The conductive line can retract out of the way when not being used.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A device to be worn on a wrist to drain static electricity from a wearer to ground, the device comprising:
   a strap that is configured to be worn on the wrist;
   a conductive line that is configured to attach to ground to drain static electricity to ground; and
   an unwinding mechanism that is coupled to the strap and to the conductive line and that is configured to enable the conductive line to be reversibly unwound from the strap.

2. A device according to claim 1 wherein the unwinding mechanism comprises a spiral spring that is coupled to the strap and to the conductive line and that is configured to compress radially to enable the line to be unwound from the strap and to expand radially to enable the line to be wound back toward the strap.

3. A device according to claim 2 wherein the unwinding mechanism further comprises a spool that is coupled to the spiral spring, wherein the conductive line is at least partially wound on the spool when the conductive line is wound back toward the strap.

4. A device according to claim 1 wherein the unwinding mechanism comprises a spool on which the conductive line is at least partially wound.

5. A device according to claim 4 wherein the unwinding mechanism further comprises a crank that is coupled to the spool.

6. A device according to claim 1 further comprising a lock that is configured to prevent winding of the conductive line toward the strap.

7. A device according to claim 6 wherein the lock comprises a friction lock.

8. A device according to claim 6 wherein the lock comprises a ratchet lock.

9. A device according to claim 1 further comprising a housing on the strap, wherein the unwinding mechanism resides in the housing and is configured to enable the conductive line to be reversibly unwound from the housing.

10. A device to be worn on a wrist to drain static electricity from a wearer to ground, the device comprising:
    means for attaching the device to the wrist;
    a conductive line that is configured to attach to ground to drain static electricity to ground; and
    means for enabling reversible unwinding of the conductive line from the means for attaching.

11. A device according to claim 10 wherein the means for enabling reversible unwinding comprises means for biasing the conductive line against unwinding.

12. A device according to claim 10 further comprising means for locking the conductive line to prevent winding of the conductive line.

13. A device according to claim 10 wherein the means for attaching comprises means for attaching the device to a wrist strap.

14. A device according to claim 10 wherein the means for attaching comprises a wrist strap.

15. A device to be worn on a wrist to drain static electricity from a wearer to ground, the device comprising:

a housing that is configured to be worn on the wrist;

a spiral spring in the housing; and a conductive line that is coupled to the spiral spring and is configured to attach to ground to drain static electricity from the wearer to ground.

16. A device according to claim 15 further comprising a lock in the housing that is configured to lock the conductive line in an extended position.

17. A device according to claim 16 wherein the lock comprises a member that is configured to frictionally engage the conductive line.

18. A device according to claim 16 wherein the lock comprises a ratchet mechanism in the housing.

19. A device according to claim 15 further comprising a wrist strap that is attached to the housing to configure the housing to be worn on a wrist.

20. A device according to claim 15 wherein the housing is configured to attach to a wrist strap.

21. A device to be worn on a wrist to drain static electricity from a wearer to ground, the device comprising:

a housing that is configured to be worn on the wrist;

a spool in the housing; and a conductive line that is wound on the spool and is configured to attach to ground to drain static electricity from the wearer to pound.

22. A device according to claim 21 further comprising a lock in the housing that is configured to lock the conductive line in an extended position.

23. A device according to claim 22 wherein the lock comprises a member that is configured to frictionally engage the conductive line.

24. A device according to claim 22 wherein the lock comprises a ratchet mechanism in the housing.

25. A device according to claim 22 further comprising a wrist strap that is attached to the housing to configure the housing to be worn on a wrist.

26. A device according to claim 22 wherein the housing is configured to attach to a wrist strap.

27. A device according to claim 21 further comprising a crank that is located outside the housing and that is coupled to the spool.

28. A method of handling, electronic components comprising:

unwinding a conductive line to extend from a wrist strap that is worn by a wearer who handles the electronic components;

attaching the conductive line to ground;

handling the electronic components during which the conductive line drains static electricity from the wearer to ground; and winding the conductive line back toward the wrist strap after handling the electronic components.

29. A method according to claim 28:

wherein the following is performed between the unwinding and handling:

locking the conductive line that is extended from the wrist strap; and wherein the following is performed between the handling and the winding;

unlocking the conductive line that is extended from the wrist strap.

30. A method according to claim 28 wherein the unwinding comprises unspooling the conductive line from a spool in the wrist strap, and wherein the winding comprises spooling the conductive line on the spool in the wrist strap.

31. A method according to claim 28 wherein the winding comprises radially expanding a spiral spring that is connected to the conductive line, and wherein the unwinding comprises radially compressing the spiral spring that is connected to the conductive line.

32. A method according to claim 28 wherein the unwinding is preceded by:

placing the wrist strap on the wearer.

33. A method according to claim 32 wherein the conductive line is at least partially enclosed in a housing, and wherein the unwinding is further preceded by:

attaching the housing to the wrist strap.

* * * * *